April 8, 1952 W. W. VARNADO 2,592,495
ICE-CREAM FREEZER SUPPORT
Filed Oct. 27, 1950
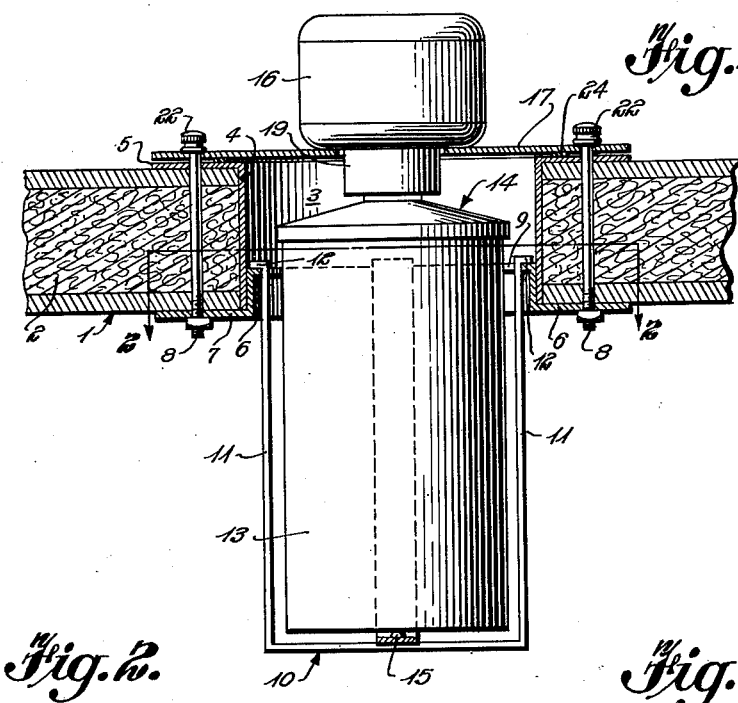
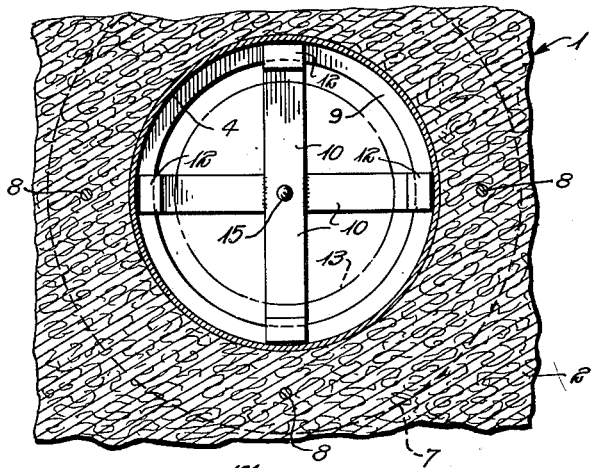
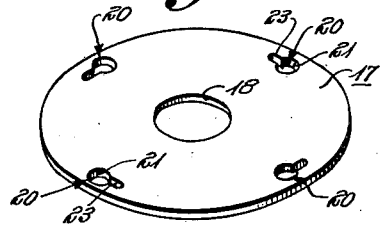
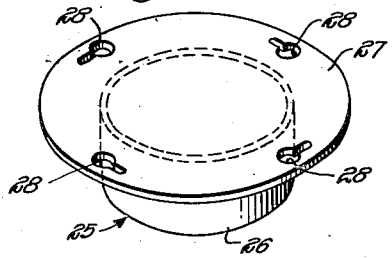
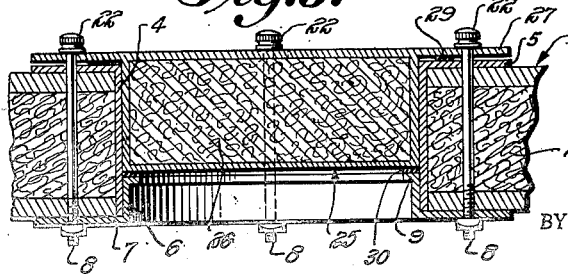
INVENTOR
Willard W. Varnado
BY
ATTORNEY

UNITED STATES PATENT OFFICE 2,592,495

ICE-CREAM FREEZER SUPPORT

Willard W. Varnado, Wiggins, Miss.

Application October 27, 1950, Serial No. 192,473

6 Claims. (Cl. 312—214)

This invention relates to an apparatus for the home manufacture of frozen confections such as ice cream and, more particularly, to a means for utilizing a conventional home freezer, sometimes called a quick freezer, for the home manufacture of ice cream.

As is well known to those skilled in the art, a customary unit used in the home manufacture of ice cream includes a cylindrical container for containing the ingredients used to make the ice cream, a stirring paddle assembly receivable within said container for mixing the ingredients, and a motor for rotating the stirring paddle assembly. In operating the unit, the cylindrical container is positioned in upright position, with the stirring paddle assembly extending down into the container, and the driving motor is supported on top of the container.

To make ice cream it is, of course, necessary to cool the container sufficiently so that freezing will take place. In the past this has been customarily accomplished by surrounding the container with crushed ice. However, the refrigerated space of a home freezer can effect better cooling of the container provided the container is suitably positioned therein. For units having a driving motor for rotating the stirring paddle assembly this means that the driving motor itself should not extend into the refrigerated space. The present invention provides a practical means of achieving such positioning.

It is therefore an object of the present invention to provide a new and improved means for utilizing a conventional home freezer, sometimes called a quick freezer, in the home manufacture of ice cream.

It is another object of the present invention to provide such a means whereby a conventional home ice cream freezer of the type having a mixing container and a stirrer motor may be positioned so that the mixing container is in the interior of the home freezer and the stirrer motor is exterior of the home freezer.

It is a further object of the present invention to provide such a means whereby such a mixing container may be readily inserted into or withdrawn from the home freezer when said freezer is closed and whereby the exit opening in the home freezer through which the mixing container is withdrawn may be readily sealed off when the mixing container is withdrawn.

It is still another object of the present invention to provide such a means whereby a freezer service man can quickly and inexpensively adapt a home freezer for use in the home manufacture of frozen confections such as ice cream.

Briefly stated, in adapting a conventional home freezer for use with a conventional motor driven home ice cream freezer in accordance with the present invention, a circular opening is first formed in the top of the home freezer. This opening is of sufficient size to permit the ice cream container to be inserted therethrough into the interior of the home freezer, being of slightly greater diameter than the diameter of said container.

After the circular opening is formed in the top of the home freezer this opening is, in effect, lined by a pair of cylindrical rings which overlap each other and which extend about the inner periphery of the opening. One of the rings has a circular flange extending therefrom, toward the axis of the opening, thus providing, in effect, a ledge extending about the inner periphery of the opening.

A bracket structure, of size and shape so that it may be inserted through the opening in the freezer top and also may be withdrawn through this opening, is adapted to engage the aforementioned ledge so that the bracket hangs from the opening and extends therefrom into the interior of the home freezer. This bracket provides a support on which the mixing container of the ice cream freezer may be seated and whereby said mixing container may be supported so that it is within the interior of the home freezer when it is desired to make ice cream. The stirrer motor of the ice cream freezer is supported by a motor mounting plate which overlies the opening in the home freezer top. This motor mounting plate has a central aperture therein which enables the motor to be connected to the stirrer paddle assembly within the mixing container.

When it is desired to remove the home ice cream freezer from the home freezer, the stirrer motor may be disconnected and then the motor mounting plate may be disconnected. Following this, the mixing container and the bracket structure may be lifted from within the home freezer and withdrawn through the opening in the top thereof, the liner rings remaining in place.

A plug is provided to close the opening in the home freezer top. This plug has a sealing gasket which is adapted to seat against the annular flange or ledge which extends about the inner periphery of the opening in the home freezer top. Means are provided to retain the plug firmly in position. Thus the home freezer top is, so to speak, restored to its former condition and when it is desired to make ice cream again it is simply necessary to remove the plug and insert the supporting bracket, container, etc. as above described.

Further objects and advantages of the present invention will become more apparent from the following detailed description taken in conjunction with the attached drawing in which Fig. 1 is an elevation view, partly in section, showing a conventional home ice cream freezer and the means for supporting such freezer with relation to a flat horizontal wall such as the top of a conventional home freezer; Fig. 2 is a sectional view taken on line 2—2 of Fig. 1, the home ice cream freezer per se being omitted; Fig. 3 is a perspective view showing the stirrer motor mounting plate; Fig. 4 is a similar perspective view showing the plug for closing the opening in the home freezer top when the home ice cream freezer is removed therefrom; and Fig. 5 is a view similar to that of Fig. 1 showing said plug in place when the home ice cream freezer is removed.

As previously mentioned, the present invention provides a practical means of readily adapting a conventional home freezer for use in the home manufacture of ice cream. Such home freezers, often referred to as quick freezers, are generally rectangular freezing cabinets having a substantially flat top. Thus, referring to Fig. 1, the horizontal wall 1 represents the top of a conventional home freezer, it being readily appreciated that such tops contain insulating material 2 as shown in Fig. 1.

As a first step in adapting the home freezer according to the teaching of the present invention, a circular opening is formed through the top thus constituting in effect a port extending completely through the top. This opening is designated generally by the numeral 3 in Fig. 1 The size of the opening 3 will depend upon the diameter of the particular ice cream freezer which it is desired to accommodate.

Once the opening 3 has been formed in the top 1 this will of course expose the insulation 2 about the inner periphery of the opening. To seal off this insulation and make a smooth periphery for the opening, a cylindrical ring 4, of height corresponding to the depth of the opening 3, is positioned within this opening so that it extends completely about the inner periphery thereof. The diameter of the ring 4 is such that it snugly engages the inner periphery of the opening 3 and thus serves as a lining for this opening. An annular flange 5 extends substantially at right angles from the cylindrical ring 4 and overlies the upper edge of the opening 3. The ring 4 may be made of any suitable material but I prefer to use thin gauge sheet metal, such as sheet steel.

A second cylindrical ring 6, of slightly less diameter than cylindrical ring 4 and of substantially less height than the depth of the opening 3, is inserted into the opening 3 from the bottom thereof and extends about the inner periphery thereof snugly against the inner surface of ring 4 as is shown in Fig. 1. In effect, ring 6 is telescoped within ring 4. This ring 6, like ring 4, has an annular flange 7 extending substantially at right angles therefrom and flange 7 overlies the lower edge of opening 3. Rings 4 and 6 are maintained in the position shown in Fig. 1 by bolts 8 which extend completely through the top 1 as shown in Fig. 1.

Ring 6 also has an inturned lip or flange 9 which extends substantially at right angles therefrom toward the axis of the ring. By virtue of this construction, when ring 6 is positioned as shown in Fig. 1, the lip or flange 9, in effect, forms a ledge extending about the inner periphery of opening 3.

This flange, i. e. ledge, 9 supports a pair of U-shaped brackets 10. The closed ends of these brackets are positioned crossways as shown in Fig. 2 so that there are four upstanding bracket arms 11. Each of these upstanding arms 11 has projecting from the upper end thereof an outturned finger 12 and each of these fingers 12 rests upon the ledge 9. In this manner the brackets 10 are supported so that the bracket assembly depends, i. e. hangs, from the opening 3.

The mixing container 13 of the home ice cream freezer assembly, denoted generally by the reference numeral 14, is supported by the brackets 10, being rested upon a round knob 15 positioned at the cross point of these brackets as is shown in Figs. 1 and 2. This enables the mixing container 13 to rotate on knob 15 in response to the action of the stirrer motor 16. The dimensions of the brackets 10, including the upstanding arms 11 thereof, are such that the mixing container 13 may be received within the opening 3 and the interior of the home freezer without extending above the top 1 of the home freezer. Thus, the mixing container may be exposed to the cold interior of the home freezer.

When the brackets 10 are in place as shown in Fig. 1 and the mixing container 13 is seated on the knob 15, the stirrer motor 16 may then be positioned for use in making ice cream. To accomplish this positioning, a motor mounting plate 17 is positioned over the opening 3. This motor mounting plate, shown in greater detail in Fig. 3, has a central aperture 18 therein adapted to receive the gear box 19 of stirrer motor 16 and thus enable the stirrer motor to be coupled to the stirrer paddle assembly (not shown) which is received within the mixing container 13.

To retain the motor mounting plate 17 in place, this plate has a plurality of key hole shaped openings 20 spaced approximately 90° apart adjacent the periphery of the plate as is shown in Fig. 3. The spacing of the openings 20 corresponds to the spacing of the bolts 8. The enlarged portions 21 of the openings 20 permit the enlarged heads 22 of bolts 8 (see Fig. 1) to be passed through the openings. Thus, considering an individual bolt, when the head 22 thereof is passed through the enlarged portion 21 of an opening 20 in plate 17, clockwise rotation of the plate 17 will cause the small portion 23 of the opening 20 to come under bolt head 22. The bolt 8 can then be tightened to retain the plate 17 firmly in position. This particular bolt head and key hole shaped slot arrangement is known and is not per se the present invention. However, it is a particularly convenient means of connecting the motor mounting plate 17 in position although it will be obvious to those skilled in the art that other suitable types of connections could be employed if desired. A circular gasket 24 is connected to the under side of plate 17 and this gasket bears against the upper surface of flange 5 to provide a seal when the plate 17 is in position as shown in Fig. 1.

After the motor mounting plate 17 has been secured in position, the stirrer motor 16 can then be positioned as is shown in Fig. 1 to complete the home ice cream freezer assembly 14 and the stirrer motor can be energized to proceed with the manufacture of the particular confection being frozen. Of course, the necessary ingredients will have been placed in the mixing container 13 in order to enable this to be accomplished.

When it is desired to remove the home ice cream freezer, 14, the stirrer motor 16 is first disconnected from the mixing container 13. Then, by loosening the bolts 8, i. e. by grasping the enlarged heads 22 thereof and rotating them, the motor mounting plate 17 can be shifted so that it can be lifted from the top of the opening 3. After this is done the mixing container 13 and the U-shaped brackets 10 can be lifted from within the home freezer and withdrawn through the opening 3.

In order to close the opening 3 when the mixing container 13 is withdrawn, an insulated plug 25 is provided. This plug 25 has a body portion 26 which is of such diameter that it fits snugly within the opening 3 as defined by the circular ring 4, see Fig. 5. The top of the plug has an annular flange 27 extending therefrom and this annular flange has a plurality of key hole shaped openings 28 therethrough. The openings 28 are similar in size and positioning to the openings 20 in motor mounting plate 17 and serve the same purpose as the openings 20. In other words, the enlarged heads 22 of bolts 8 may be passed through the enlarged portions of openings 28 and then the plug 25 may be rotated clockwise so that when the bolts 8 are tightened the plug 25 will be maintained securely in position as is shown in Fig. 5.

In order to provide a tight seal when the plug 25 is in position as shown in Fig. 5, the plug has a circular gasket 30 extending about the lower edge thereof and another circular gasket 29 attached to the underside of annular flange 27. When the plug is tightened in place, gasket 30 bears against the upper surface of flange, i. e. ledge, 9 and gasket 29 bears against the upper surface of flange 5 as shown in Fig. 5. Thus, heat transfer through the opening 3 may be effectively blocked by means of the plug 25 and its associated seals.

From the foregoing description it can be seen that the present invention provides a means for readily adapting a conventional home freezer for use in the home manufacture of ice cream. Parts of the invention, such as the lining rings 4 and 6, the mounting plate 17, etc., can be made up in standard sizes and stocked by a supplier. The component parts needed to make a single installation can be supplied as a "conversion kit."

A person such as a home freezer service man can readily make the initial installation. This involves making the opening (which will usually be circular but need not necessarily be circular if another shape is desired) through the top of the home freezer and then installing the liner rings 4 and 6 and the bolts 8. The other parts, such as the brackets 10, mounting plate 17 and plug 25 will be appropriately positioned by the user of the home freezer. The home freezer is thus adapted for use in the home manufacture of frozen confections such as ice cream without impairing its other uses. Moreover, by means of the present invention, such adaptation is relatively inexpensive to accomplish.

Although I have shown and described a preferred embodiment of my invention, I wish it to be understood that I do not intend to be restricted solely thereto but that I do intend to include such modifications thereof as will be evident to those skilled in the art and which come within the spirit and scope of my invention.

Having thus described my invention, what is claimed as new and desired to be secured by Letters Patent is:

1. An attachment for supporting an elongated container with respect to a cabinet having a top with an opening therein through which said container may be inserted into the interior of the cabinet when the top is closed, said attachment being adapted to support said container in depending relation from said opening and said attachment comprising a liner adapted to fit within said opening and about the inner periphery thereof, said liner having a surface portion which forms a ledge about the periphery of said opening when the liner is fitted within the opening, a bracket, said bracket being insertable through said opening, means on said bracket adapted to rest on said ledge surface to support the bracket when said liner is in place within the opening whereby said bracket can depend from said opening and thus form a support upon which said container may be seated, and means to detachably connect said liner to the cabinet top.

2. An attachment for supporting an elongated container with respect to a cabinet having a top with an opening therein through which said container may be inserted into the interior of the cabinet when the top is closed, said attachment being adapted to support said container in depending relation from said opening and said attachment comprising a liner adapted to fit within said opening and about the inner periphery thereof, said liner having a surface portion which forms a ledge within said opening and about the inner periphery thereof when the liner is fitted within the opening, a bracket, said bracket being insertable through said opening and having supporting fingers extending therefrom, said fingers being adapted to rest on said ledge surface to support the bracket when said liner is in place within the opening whereby said bracket can depend from said opening and thus form a support upon which said container may be seated, and means to detachably connect said liner to the cabinet top.

3. An attachment for supporting a home ice cream freezer having an elongated cylindrical container and a stirrer motor positioned in extension of said container and adjacent one end thereof, said attachment being adapted for use with a freezer cabinet having a flat top with an opening therethrough through which said container may be inserted into said cabinet, said attachment being adapted to support said ice cream freezer so that the container thereof extends into the interior of the freezer cabinet and the stirrer motor is exterior of said cabinet, said attachment comprising a liner adapted to fit within said opening and about the inner periphery thereof, said liner having a surface portion which forms a ledge about the periphery of said opening when the liner is fitted within the opening, container supporting means adapted to rest on said ledge surface, said means being insertable into said freezer cabinet through said opening, a plate for supporting said stirrer motor above the opening in the freezer cabinet top, said plate being adapted to overlie said opening and having an aperture therein through which said motor may be connected to said elongated container, means to connect both said liner and motor mounting plate to the freezer cabinet top, and means to remove said motor mounting plate from said cabinet top without disconnecting said liner therefrom.

4. An attachment for supporting a home ice cream freezer having an elongated cylindrical container and a stirrer motor positioned in extension of said container and adjacent one end thereof, said attachment being adapted for use with a freezer cabinet having a flat top with an opening therethrough through which said container may be inserted into said cabinet, said attachment being adapted to support said ice cream freezer so that the container thereof extends into the interior of the freezer cabinet and the stirrer motor is exterior of said cabinet, said attachment comprising a liner adapted to fit within said opening and about the inner periphery thereof, said liner having a surface portion which forms a ledge within said opening and about the inner periphery thereof when the liner is fitted within the opening, container supporting means adapted to rest on said ledge surface, said means being insertable into said freezer cabinet through said opening, a plate for supporting said stirrer motor above the opening in the freezer cabinet top, said plate being adapted to overlie said opening and having an aperture therein through which said motor may be connected to said elongated container, a plurality of bolts, said liner having bolt openings therein engageable by said bolts whereby said liner may be bolted to the freezer cabinet top, said bolts having enlarged heads extending therefrom and said heads being positionable exteriorly of said freezer cabinet when said liner is bolted thereto, and said motor mounting plate having slots adapted to receive said bolt heads whereby said bolts can retain said motor mounting plate against the exterior of said cabinet.

5. An attachment for supporting an elongated cylindrical ice cream freezer container with respect to a freezer cabinet having a flat top with a circular opening therethrough through which said container may be inserted into the interior of said cabinet when the top is closed, said attachment being adapted to support said container in depending relation from said opening and said attachment comprising a first circular ring having a cylindrical portion of slightly less diameter than the diameter of said opening and of substantially the same height as the depth of said opening whereby said cylindrical portion may be positioned in said opening and will line said opening, a second circular ring having a cylindrical portion of slightly less diameter than the cylindrical portion of said first circular ring whereby said second ring may be telescoped within said first ring, means on said second circular ring forming a ledge surface about the periphery of said opening when said second ring is so telescoped, container supporting means adapted to rest on said ledge surface, said last mentioned means being insertable into said freezer cabinet through the opening in the top thereof, and means to detachably connect said respective circular rings to said freezer cabinet top.

6. An attachment for supporting an elongated cylindrical ice cream freezer container with respect to a freezer cabinet having a flat top with a circular opening therethrough through which said container may be inserted into the interior of said cabinet when the top is closed, said attachment being adapted to support said container in depending relation from said opening and said attachment comprising a first circular ring having a cylindrical portion of slightly less diameter than the diameter of said opening and of substantially the same height as the depth of said opening whereby said cylindrical portion may be positioned in said opening and will line said opening, said first circular ring having an annular flange extending therefrom and adapted to overlie the upper edge of said opening, a second circular ring having a cylindrical portion of slightly less diameter than the cylindrical portion of said first circular ring whereby said second ring may be telescoped within said first ring, a circular flange extending substantially at right angles from the cylindrical portion of said second ring and toward the axis of said cylindrical portion whereby, when said cylindrical portion is positioned within the opening in the freezer cabinet top said flange forms a ledge extending about the inner periphery of said opening, said second circular ring also having an annular flange extending therefrom and adapted to overlie the lower edge of the freezer cabinet top opening, container supporting means adapted to rest on said ledge forming flange, said means being insertable into said freezer cabinet through the opening in the top thereof, and means adapted to engage the annular flanges of said respective circular rings to clamp said flanges against the freezer cabinet top and thus maintain the respective cylindrical portions of said rings in position within said opening.

WILLARD W. VARNADO.

REFERENCES CITED

The following references are of record in the file of this patent:

UNITED STATES PATENTS

| Number | Name | Date |
|---|---|---|
| 1,637,656 | Radcliffe | Aug. 2, 1927 |
| 1,911,969 | Prendergrast | May 30, 1933 |
| 1,916,746 | Swisher | July 4, 1933 |
| 1,952,985 | Hopkes | Mar. 27, 1934 |
| 1,956,621 | Parker | May 1, 1934 |
| 2,046,132 | Purdy | June 30, 1936 |
| 2,519,051 | Kirk | Aug. 15, 1950 |
| 2,555,624 | Anderson | June 5, 1951 |